Figure 1:
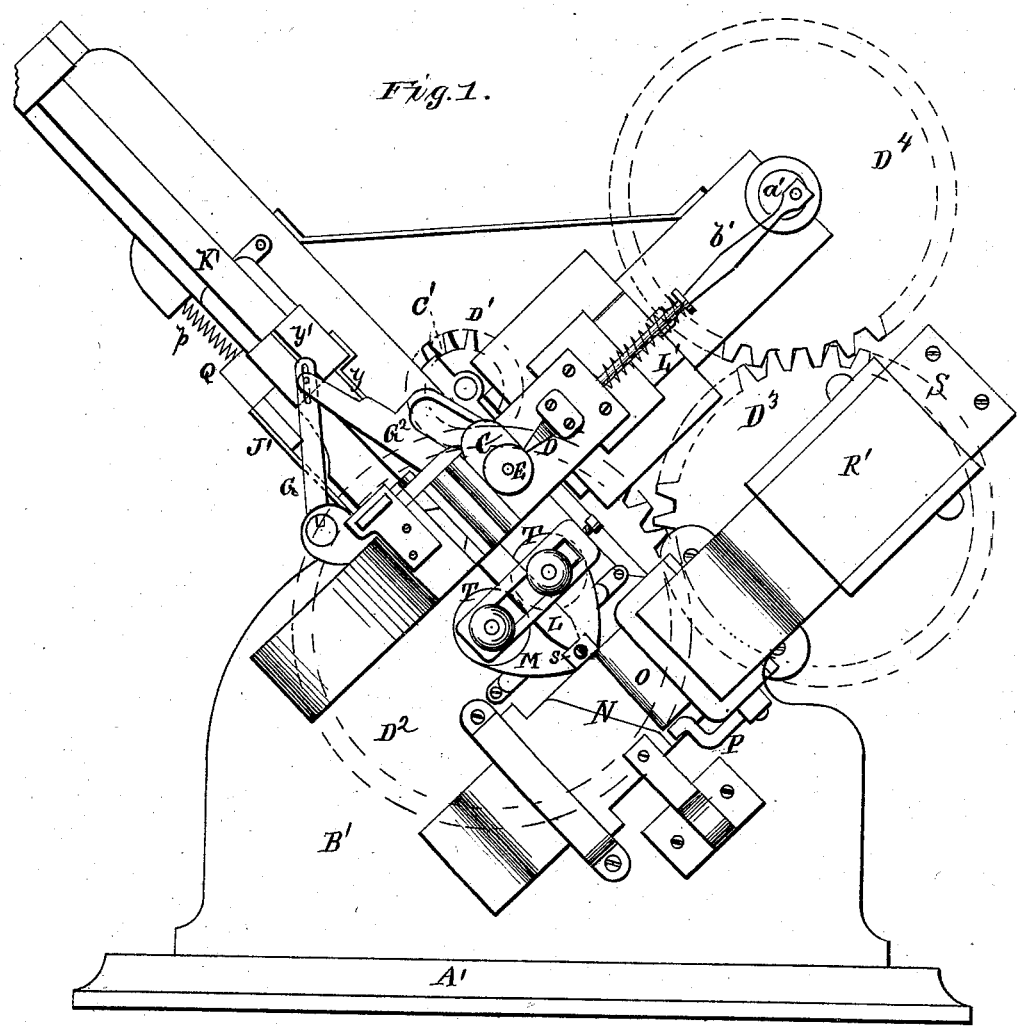

3 Sheets—Sheet 1.

R. M. CUMMINGS.
MACHINE FOR MAKING HORSESHOE NAILS.

No. 190,011. Patented April 24, 1877.

WITNESSES
Franck L. Ouraud
Henry N. Miller

INVENTOR
Richard M. Cummings.
Alexander Mason
ATTORNEY

R. M. CUMMINGS.
MACHINE FOR MAKING HORSESHOE NAILS.
No. 190,011. Patented April 24, 1877.
3 Sheets—Sheet 2.
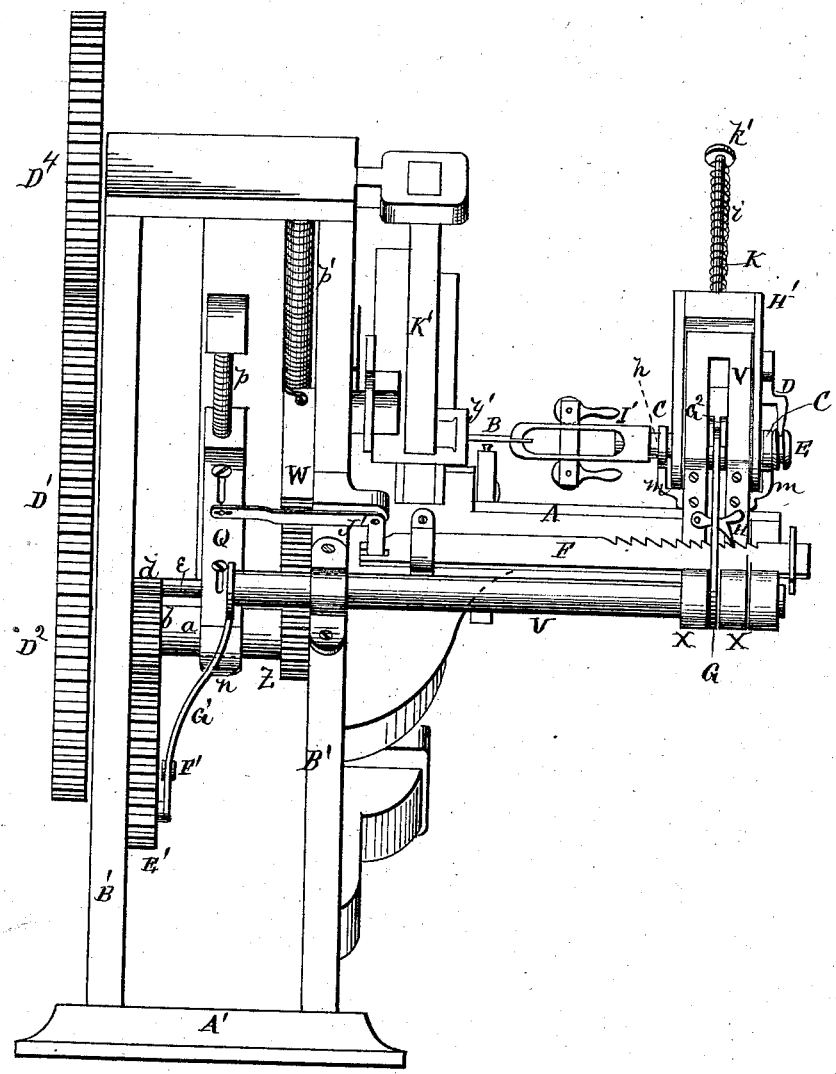

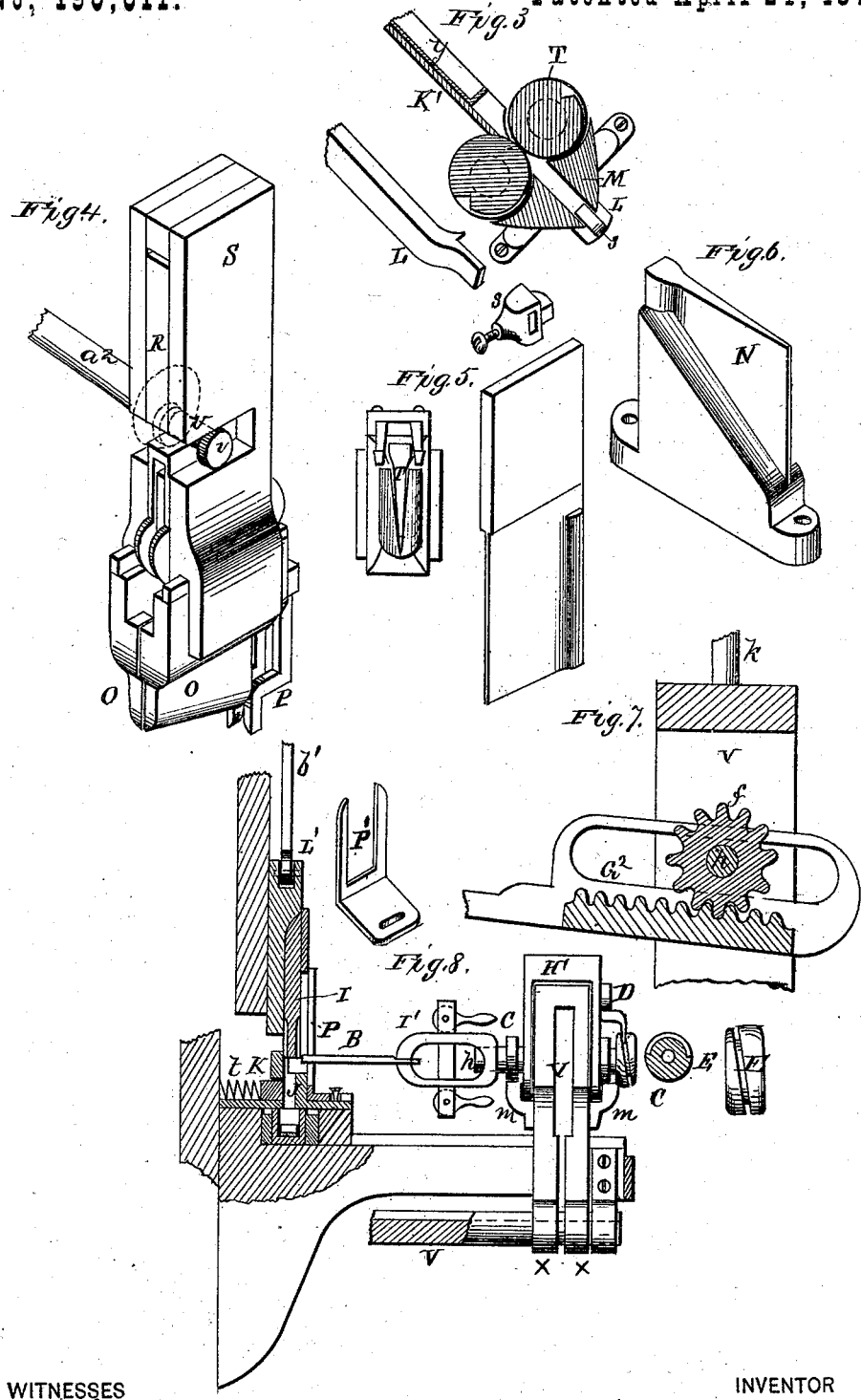

UNITED STATES PATENT OFFICE.

RICHARD M. CUMMINGS, OF NASHUA, NEW HAMPSHIRE.

IMPROVEMENT IN MACHINES FOR MAKING HORSESHOE-NAILS.

Specification forming part of Letters Patent No. 190,011, dated April 24, 1877; application filed April 7, 1877.

*To all whom it may concern:*

Be it known that I, RICHARD M. CUMMINGS, of Nashua, in the county of Hillsborough, and in the State of New Hampshire, have invented certain new and useful Improvements in Machine for Making Horseshoe-Nails; and do hereby declare that the following is a full, clear, and exact description thereof, reference being had to the accompanying drawings, and to the letters of reference marked thereon, making a part of this specification.

The nature of my invention consists in the construction and arrangement of a machine for making horseshoe-nails, as will be hereinafter more fully set forth, and pointed out by the claims.

In order to enable others skilled in the art to which my invention appertains to make and use the same, I will now proceed to describe its construction and operation, referring to the annexed drawings, in which—

Figure 1 is a side elevation of my entire machine. Fig. 2 is a rear view of the same. Figs. 3 to 8 are detached views of detailed parts thereof.

A represents the bed of my machine, upon which is erected a suitable frame-work, B', to which all the working parts of the machine are connected.

C' is the driving-shaft, to which power is applied by crank or belt, or in any other suitable manner. On this shaft, on one side of the frame, is secured a pinion, $D^1$, which gears with a cog-wheel, $D^2$, this with a cog-wheel, $D^3$, and this again with a cog-wheel, $D^4$, said cog-wheels being secured upon their respective shafts, and through which motion is communicated to all parts of the machine.

Within the frame B', on the shaft $a$ of the cog-wheel $D^2$, is secured a pinion, $b$, which meshes with a pinion, $d$, on a shaft, $e$, and also with a cog-wheel, E', mounted upon a stud in the frame.

The cog-wheel E' is, by a crank-pin and pitman, F', connected with an arm, $G^1$, projecting from a rocking shaft, U, which has a longitudinal groove. On this shaft is placed an arm, G, which has a feather entering the groove in the shaft, so that said arm is capable of being moved on the shaft, and yet rock with it back and forth.

The arm G is placed between two collars, X X, formed on the projecting lower end of a sliding block, V, the shaft or rod U passing through said collars, and the block V sliding longitudinally upon an arm, A, projecting from the frame B'.

At the upper end of the arm G is pivoted a slotted rack, $G^2$, which passes through a vertical slot in the sliding block V, and operates on a pinion, $f$, secured on a shaft, $h$, within said block.

The shaft $h$ passes through vertical slots in the sides of the block V, and has its bearings in the ends of a yoke, H', placed over the top of the block, as shown in Fig. 2. From the block V a rod, $k$, extends upward through the yoke H', with a knob, $k'$, on its upper end, and a spiral spring, $i$, surrounding the rod, whereby the yoke is pressed downward, and yet allowed to yield upward.

Outside of the yoke H', on both ends of the shaft $h$, are secured cams C, which bear against ledges $m$ on the sides of the sliding block V, for raising the yoke H', with the shaft, once during each revolution of said shaft.

On the outer end of the shaft $h$ is secured a collar, E, with spiral groove, into which takes a guide-pin, D, secured to the yoke H', for moving the shaft $h$ lengthwise out and in. On the inner end of the shaft $h$ is secured a clamp, I', for holding the plate B, from which the nail-blanks are cut.

The sliding block V is fed inward on the arm A by means of a rack-bar, F, operating on a pawl, H, pivoted to the block. The rack-bar F is, by an elbow-lever, J', connected with a sliding bar, Q, which is operated by a cam, $r$, on the shaft $a$ at one end, and by a spring, $p$, at the other end.

On the shaft $a$ is further secured a cogged segment, Z, which operates a rack-bar, W, and to this rack-bar is secured a block, Y', carrying the clearer Y; this block moving upon a guide-bar, K', in which is a longitudinal groove for the clearer Y to work in.

To the block Y' are also attached forwardly-extending spring-fingers L L, having upon their ends suitable jaws s s, fastened by set-screws.

The shafts a and e carry upon their ends rolls T T, which have suitable grooves and recesses, as shown in Fig. 3, to receive the head and body of the nail.

In front of these rolls is a stationary funnel-shaped guide, M, for the passage of the nails, the jaws s on the fingers L working immediately in front of said funnel. $p'$ is a spring to bring the rack-bar W back in position.

$a^1$ is the shaft of the cog-wheel $D^4$, and on the end of this shaft is a crank-pin, connected, by a pitman, $b'$, with a cross-head, $L'$, carrying the cutter I, which, in its downward movement, cuts the blank from the plate B, and forces the same into the die J below, where it is held by the presser K, operated by a spring, t, as shown in Fig. 8.

$a^2$ is the shaft of the cog-wheel $D^3$, and this shaft passes through a plunger-box, $R'$, secured to the side of the frame $B'$, and within this plunger-box is a hollow plunger, S, carrying the cutters O O at its lower end.

R is an interior plunger within the plunger S, said interior plunger carrying, at its lower end, the presser $T'$, which works between the cutters O O.

The two plungers R and S are operated by cams v v on the shaft $a^2$, as shown in Fig. 4. The presser $T'$ is held in the slot of the plunger R, and adjusted by suitable gibs and keys. The cutters O are made in halves, and riveted together, and held in two slots in the plunger S, and adjusted in the same manner.

On the front of the plunger S, at the lower end, are fastened fork-springs P, as shown.

$P'$ is a slotted guide, adjustably attached to the die J, in which the nail-plate B works.

The operation of the machine is as follows: The cutter I descends and cuts the blank from the plate B, carrying the blank into the die J, where it is held by the head by the presser K until the next blank is cut, pushing the first toward the bottom of the die. Then the third blank is cut, pushing the second toward the bottom of the die.

The first blank is then relieved, and carried to the rolls T by the clearer Y, passing through the funnel-shaped guide M, and carried to the spring-fork P by the fingers L, and trimmed by the cutters O, the spring-fork P holding the nail by the head while the nail is being finished. At the same time the blank is pointed by the inside presser $T'$ upon the former N below, while the trimmings are carried down on said former.

The finished nail is pushed through the fork P by the head of the following nail.

The fingers L are opened when drawn back over the nose of the guide M, allowing the head of the nail to pass through, and, while the shank of the nail is still in the rolls, the fingers clasp the nail under the head, and move with the same velocity as the nail in the roll by means of the cogged segment Z, rack W, and block $Y'$.

The plate B, from which the blanks are cut, is fed by means of the block V, sliding on the arm A, and the collars X, formed on said block, slide on the rod or shaft U by means of F and pawl H, which are driven by the rod Q.

The plate B makes a half-revolution after each blank is cut, first forward and then backward, so that the blanks will be cut from the plate alternately from opposite sides, and thus making no waste.

The plate is cleared from the punch or cutter I while revolving by the spiral collar E and guide D, which vibrate the plate clamp or holder every half-revolution. This plate-clamp is revolved by the pinion and pawl or rack passing through the movable block V. The plate is kept parallel with the die J by the yoke $H'$ and spring i, and the edges of the plate are cleared from the die while revolving by the yoke rising, from the action of the cams C on the ledges m.

Having thus fully described my invention, what I claim as new, and desire to secure by Letters Patent, is—

1. The combination of the sliding block V, yoke $H'$, carrying the shaft h, with plate-clamp $I'$, the rod k, and spring i, substantially as and for the purposes herein set forth.

2. The combination of the vibrating yoke $H'$, the shaft h, carrying the plate-clamp $I'$, the pinion f, rack $G^2$, arm G, and rocking shaft U, all constructed and arranged to operate substantially as and for the purposes herein set forth.

3. The combination of the arm A, the sliding block V, with collars X X, rocking shaft U, rack-bar F, and pawl H, substantially as and for the purposes herein set forth.

4. The spirally-grooved collar E and guide D, in combination with the rocking shaft h, carrying the plate-clamp $I'$, substantially as and for the purposes herein set forth.

5. The cams C C, attached to the rocking shaft h, in combination with the yoke $H'$ and sliding block V, with ledges m m, substantially as and for the purposes herein set forth.

6. The combination of the longitudinally-grooved guide-bar $K'$, the clearer Y, and sliding block $Y'$, operated by means of the rack-bar W, cogged segment Z, and spring $p'$, substantially as and for the purposes herein set forth.

7. The spring-fingers L L, provided with the jaws s s, and attached to the sliding block $Y'$, to operate substantially as and for the purposes herein set forth.

8. The combination of the sliding block $Y'$ with clearer Y, the guide-bar $K'$, rollers T T, guide M, and spring-fingers L L, with jaws s s, all constructed substantially as and for the purposes herein set forth.

9. The presser K, in combination with the die J and the spring t, substantially as and for the purposes herein set forth.

10. The combination of the reciprocating cutter I and the stationary die J with spring-presser K, substantially as and for the purposes herein set forth.

11. The combination of the plunger S, with adjustable cutters O O, the plunger R, with adjustable presser T', and the former N, substantially as and for the purpose described.

12. The spring-fork P, attached to the plunger S, and operating as and for the purposes herein set forth.

In testimony that I claim the foregoing I have hereunto set my hand this 4th day of April, 1877.

R. M. CUMMINGS.

Witnesses:
 FRANK GALT,
 J. C. SCHROEDER.